US011335024B2

(12) United States Patent
Meier et al.

(10) Patent No.: US 11,335,024 B2
(45) Date of Patent: May 17, 2022

(54) METHOD AND SYSTEM FOR PROCESSING AN IMAGE AND DETERMINING VIEWPOINTS OF OBJECTS

(71) Applicant: TOYOTA MOTOR EUROPE, Brussels (BE)

(72) Inventors: Sven Meier, Brussels (BE); Norimasa Kobori, Brussels (BE); Wadim Kehl, Munich (DE); Fabian Manhardt, Munich (DE); Federico Tombari, Munich (DE)

(73) Assignee: TOYOTA MOTOR EUROPE, Brussels (BE)

( * ) Notice: Subject to any disclaimer, the term of this patent is extended or adjusted under 35 U.S.C. 154(b) by 128 days.

(21) Appl. No.: 16/757,550

(22) PCT Filed: Oct. 20, 2017

(86) PCT No.: PCT/EP2017/076883
§ 371 (c)(1),
(2) Date: Apr. 20, 2020

(87) PCT Pub. No.: WO2019/076467
PCT Pub. Date: Apr. 25, 2019

(65) Prior Publication Data
US 2021/0374988 A1    Dec. 2, 2021

(51) Int. Cl.
*G06T 7/73* (2017.01)
*G06T 7/536* (2017.01)
*G06K 9/62* (2022.01)

(52) U.S. Cl.
CPC .............. *G06T 7/73* (2017.01); *G06K 9/6267* (2013.01); *G06T 7/536* (2017.01);
(Continued)

(58) Field of Classification Search
CPC . G06T 7/73; G06T 7/536; G06T 2207/10024; G06T 2207/10028;
(Continued)

(56) References Cited

U.S. PATENT DOCUMENTS 10,223,610 B1 * 3/2019 Akselrod-Ballin ........................ G06K 9/6273
10,445,402 B1 * 10/2019 Wang .................... G06N 3/0454
(Continued)

FOREIGN PATENT DOCUMENTS

| JP | 2012141962 A | 7/2012 |
| JP | 2016-66187 A | 4/2016 |
| JP | 2017142780 A | 8/2017 |

OTHER PUBLICATIONS

Xiang, Y., et al., "ObjectNet3D: A Large Scale Database for 3D Object Recognition," European Conference on Computer Vision, ECCV 2016, Sep. 17, 2016.*
(Continued)

*Primary Examiner* — Xuemei G Chen
(74) *Attorney, Agent, or Firm* — Oliff PLC

(57) ABSTRACT

A system and a method for processing an image include inputting the image to a neural network configured to: obtain a plurality of feature maps, each feature map having a respective resolution and a respective depth, perform a classification on each feature map to deliver, for each feature map: the type of at least one object visible on the image, the position and shape in the image of at least one two-dimensional bounding box surrounding the at least one object, at least one possible viewpoint for the at least one object, at least one possible in-plane rotation for the at least one object.

14 Claims, 3 Drawing Sheets

(52) U.S. Cl.
CPC ............ *G06T 2207/10024* (2013.01); *G06T 2207/10028* (2013.01); *G06T 2207/20016* (2013.01); *G06T 2207/20081* (2013.01); *G06T 2207/20084* (2013.01)

(58) Field of Classification Search
CPC . G06T 2207/20016; G06T 2207/20081; G06T 2207/20084; G06T 7/70; G06K 9/6267
See application file for complete search history.

(56) References Cited

U.S. PATENT DOCUMENTS

| | | | | |
|---|---|---|---|---|
| 10,803,616 | B1* | 10/2020 | Twigg | G06K 9/00389 |
| 2018/0012411 | A1* | 1/2018 | Richey | G06T 19/006 |
| 2018/0018508 | A1* | 1/2018 | Tusch | G06K 9/00771 |
| 2018/0137644 | A1* | 5/2018 | Rad | G06K 9/00208 |
| 2018/0150684 | A1* | 5/2018 | Wang | G06K 9/00275 |
| 2018/0211128 | A1* | 7/2018 | Hotson | G01S 17/89 |
| 2018/0268601 | A1* | 9/2018 | Rad | G06T 7/75 |
| 2018/0295375 | A1* | 10/2018 | Ratner | G06T 7/136 |
| 2018/0349746 | A1* | 12/2018 | Vallespi-Gonzalez | G01S 17/89 |
| 2020/0019794 | A1* | 1/2020 | Engelcke | G06N 3/0454 |
| 2020/0242451 | A1* | 7/2020 | Cao | G06N 3/0481 |
| 2020/0272902 | A1* | 8/2020 | Feng | G06K 9/4628 |
| 2020/0349722 | A1* | 11/2020 | Schmid | G06N 3/084 |

OTHER PUBLICATIONS

Wang, W., et al., "Fast object recognition and 6d pose estimation using viewpoint oriented color-shape histogram," in ICME, 2013.*
Phattaralerphong, J., et al., "A method for 3D reconstruction of tree crown volume from photographs: assessment with 3D-digitized plants," Tree Physiology 25, pp. 1229-1242, Aug. 1, 2005.*
Poirson et al.; "Fast Single Shot Detection and Pose Estimation;" 2016 Fourth International Conference on 3D Vision; IEEE; 2016; pp. 676-684.
Xiang et al.; "ObjectNet3D: A Large Scale Database for 3D Object Recognition;" ECCV 2016, Part VIII, LNCS 9912; 2016; pp. 160-176.
Liu et al.; "SSD: Single Shot MultiBox Detector;" ECCV 2016, Part I, LNCS 9905; 2016; pp. 21-37.
Ning et al.; "Inception Single Shot Multibox Detector for Object Detection;" Proceedings of the IEEE International Conference on Multimedia and Expo Workshops (ICMEW); 2017; pp. 549-554.
Szegedy et al.; "Inception-v4, Inception-ResNet and the Impact of Residual Connections on Learning;" Arxiv.org., Cornell University Library; 2016; 12 pages.
Mousavian et al.; "3D Bounding Box Estimation Using Deep Learning and Geometry;" 2016; pp. 7074-7082.
Jan. 5, 2018 Search Report issued in International Patent Application No. PCT/EP2017/076883.
Jan. 5, 2018 Written Opinion issued in International Patent Application No. PCT/EP2017/076883.
Yu Xiang et al., OBJECTNET3D: A Large Scale Database for 3D Object Recognition, Stanford University, Network and Parallel Computing, United States, Springer International Publishing, 2016.
Patrick Poirson, et al, "Fast Single Shot Detection and Pose Estimation", 2016 Fourth International Conference on 3D Vision, pp. 676-684, , United States, IEEE, 2016.

* cited by examiner

METHOD AND SYSTEM FOR PROCESSING AN IMAGE AND DETERMINING VIEWPOINTS OF OBJECTS

FIELD OF THE DISCLOSURE

The present disclosure is related to the field of image processing, and more precisely to the detection of three-dimensional objects on the image.

DESCRIPTION OF THE RELATED ART

It has been proposed to detect three-dimensional objects on images acquired by cameras.

Typically, it is also desirable to obtain the 6D pose of the objects visible on an image. "6D pose" is an expression well known to the person skilled in the art which designates the combination of the three-dimensional position and of the three-dimensional orientation of an object.

Known methods to detect objects are not satisfactory. For example, known methods may require that depth information be used (for example using images known to the skilled person as "RGB-D" or "RGB-Depth". Known methods may also fail to detect specific objects such as objects with difficult geometries or textures, or even small objects.

Some methods provide very coarse information on the viewpoint (the angle from which an object is seen on an image) or on the 6D pose. For example, some methods only indicate that an object is seen from the side or from below.

Thus, there is a need for improved methods to process images, and notably to detect objects and their viewpoints.

From the prior art, the following documents are known:
A. Mousavian, D. Anguelov, J. Flynn, and J. Kosecka. "3D Bounding Box Estimation Using Deep Learning and Geometry". arXiv:1612.00496, 2016.
P. Poirson, P. Ammirato, C.-Y. Fu, W. Liu, J. Kosecka, and A. C. Berg. "Fast Single Shot Detection and Pose Estimation". In 3DV, 2016.
W. Liu, D. Anguelov, D. Erhan, C. Szegedy, S. Reed, C.-y. Fu, and A. C. Berg. "SSD: Single Shot MultiBox Detector". In ECCV, 2016

SUMMARY OF THE DISCLOSURE

The present disclosure overcomes one or more deficiencies of the prior art by proposing a method for processing an image comprising inputting the image to a neural network configured to:
obtain a plurality of feature maps, each feature map having a respective resolution and a respective depth,
perform a classification on each feature map to deliver, for each feature map:
  the type of at least one object (one or a plurality of objects) visible on the image,
  the position and shape in the image of at least one two-dimensional bounding box surrounding the at least one object,
  at least one possible viewpoint for the at least one object,
  at least one possible in-plane rotation for the at least one object.

By way of example, the image can be a color image such as an RGB (Red-Green-Blue) image known to the skilled person.

A feature map is a matrix of vectors, the expression resolution is directed at the resolution of the matrix and the depth relates to the depth of the vectors of the matrix.

The expression "neural network" used in the present application can cover a combination of a plurality of known networks. For example, the step of obtaining a plurality of feature maps may be performed using a first sub-network. The skilled person will know which sub-network to use to obtain the feature maps having a respective resolution and a respective depth.

The step of performing a classification may also be performed by a second sub-network. The skilled person will know which sub-network to use to deliver, for each feature map:
the type of at least one object visible on the image,
the position and shape in the image of at least one two-dimensional bounding box surrounding the at least one object,
at least one possible viewpoint for the at least one object,
at least one possible in-plane rotation for the at least one object.

It should be noted that the skilled person knows that a bounding box is a virtual rectangle having coordinates that enclose the object. Each object is associated with at least one bounding box if multiple objects are determined. The bounding boxes can be selected among a plurality of predetermined bounding boxes; the classification step being configured to determine the best bounding boxes (i.e. the bounding boxes which are the closest to the object).

The type of an object is chosen among a predetermined set of objects which can be detected.

The viewpoint is the angle from which the object is seen on the image, for example measured from a reference angle.

The in-plane rotation is the rotation around the optical axis of the image acquisition module, or camera, used to acquire the image.

By way of example, the neural network may output one of more groups of information each associated with an object visible on the image, with each group comprising the type of the object, the position and shape of a bounding box surrounding the object, the viewpoint, and the in-plane rotation.

If several objects are visible on the image, then the neural network may output at least two groups of information as defined above.

Also, the neural network may output two or more groups of information for a same object, for example with a difference between the two groups relating to the viewpoint.

It should be noted that using said neural network allows using massively parallel single pass networks, yielding vast increases in computational speed (the above method has been observed to work around 10 Hz, i.e. 10 images per second), and allows obtaining good accuracy.

Furthermore, by performing a classification which delivers possible viewpoints, it is possible to select the viewpoints in a predetermined set of viewpoints. Thus, this allows obtaining an improved precision to which the viewing angle is being predicted by the network. For example, the viewing angle can be determined with a precision of the order of 5 degrees or less.

According to an embodiment, the image is a colour image (for example a RGB image), or a colour and depth image (for example a RGB-D image).

It should be noted that the use of depth improves the accuracy of the method.

According to an embodiment, the classification is performed by means of a kernel perceptron.

According to an embodiment, more than two feature maps are obtained, or six feature maps are obtained, the feature maps each having a different resolution.

The inventors of the present invention have observed that good results are obtained with six features maps. Using varying resolutions (and depths for at least some of the feature maps) allows coping with different scales of objects visible on the images.

According to an embodiment, the method further comprises obtaining the 6D pose of at least one object using the at least one possible viewpoint for the at least one object, and the at least one possible in-plane rotation for the at least one object.

It has been observed that it is possible to parse the output of the neural network so as to obtain the 6D-pose of at least one object. Most notably, it should be noted that the obtaining the viewpoint and the in-plane rotation allows obtaining the 6D pose.

By way of example, it is possible to perform a classification on the viewpoint and on the in-plane rotation so as to obtain the 6D pose in the form of a translation matrix and a rotation matrix.

According to an embodiment, obtaining the 6D pose further comprises refining the 6D pose using a color-based approach, or a contour-based approach, or a Depth-based approach.

For example, the Depth-based approach can use the ICP (Iterative Closest Point) method.

If RGB images are used, then it is possible to render the object so as to verify its alignment with the object initially present on the image.

According to an embodiment, the method further comprises a preliminary training of the neural network, said preliminary training comprising inputting a template image in which at least one three-dimensional template object has been rendered to the neural network.

Rendering a three-dimensional template object means elaborating an image in which a projection of this template object is visible with a selected angle.

Preferably, the method will be used on images which comprise an object which has been used as template object.

By using said rendering, it is possible to better cope with symmetrical objects and to eliminate the viewpoint confusions resulting from symmetry.

According to an embodiment, said preliminary training further comprises: obtaining, using said neural network:
 the type of at least one template object visible on the template image,
 the position and shape in the template image of at least one two-dimensional bounding box surrounding the at least one object,
 at least one possible viewpoint for the at least one template object,
 at least one possible in-plane rotation for the at least one template object,
and minimizing L in the following equation:

$$L(Pos, Neg) = \sum_{b \in Neg} L_{class} + \sum_{b \in Pos} (L_{class} + \alpha L_{fit} + \beta L_{view} + \gamma L_{inplane})$$

in which:
Pos represents the bounding boxes which have an area which encloses a predefined fraction of area of template object,
Neg represents the bounding boxes which have an area which does not enclose a predefined fraction of area of template object,
b is a bounding box belonging to either Pos or Neg,
$L_{class}$ is the loss associated with errors in the attribution of class,
$L_{fit}$ is the loss associated with errors the location of the corners of bounding boxes,
$L_{view}$ is the loss associated with errors in the attribution of viewpoints,
$L_{inplane}$ is the loss associated with errors in the attribution of in-plane rotations,
$\alpha$, $\beta$, and $\gamma$ being predetermined coefficients.

By way of example, $L_{class}$, $L_{view}$, and $L_{inplane}$ can be obtained by softmax cross-entropy loss in a manner known to the person skilled in the art.

Also by way of example, $L_{fit}$ can be obtained by smooth L1 regression in a manner known to the person skilled in the art.

L(Pos, Neg) is a loss function which is considered by the person skilled in the art to represent an energy to be minimized during the training of the neural network. Alternatively, L(Pos, Neg) is considered to be an objective function to be minimized during the training of the neural network.

$\alpha$, $\beta$, and $\gamma$ may be selected in accordance with the importance attributed to each loss during training of the neural network.

According to an embodiment, the possible viewpoints are selected among a predetermined set of viewpoints, and wherein:
if a template object is symmetrical, then the viewpoints of the predetermined set of viewpoints are all placed on an arc of a sphere centered on the template object,
if a template object is semi-symmetrical, then the viewpoints of the predetermined set of viewpoints are all placed on one hemisphere of a sphere centered on the template object.

This allows improving the ability of the neural network to detect symmetrical or semi-symmetrical objects.

It should be noted that a symmetrical object is, in the present application, an object presenting an axial symmetry such as a bottle or such as a cylindrical object (for these objects, the axis of symmetry passes by the center of the object).

Also, in the present application, a semi-symmetrical object is an object which presents a planar symmetry sometimes referred to as a left-right symmetry (a bug or a spoon fall into this category, for these objects, there is a symmetry plane passing by a central axis of the object.

According to an embodiment, the neural network outputs one of more groups of information each associated with an object visible on the image, with each group comprising the type of the object, the position and shape of a bounding box surrounding the object, the viewpoint, and the in-plane rotation, and the method further comprises:
 elaborating a score (for example a scalar value) for each group outputted by the neural network,
 comparing each score predetermined threshold,
 keeping only the groups having a score above said threshold.

The score may be obtained so as to illustrate the accuracy of the group of information. The formula used to calculate the score can be selected by the person skilled in the art during a calibration step.

Furthermore, said predetermined threshold can be set during a calibration step.

According to an embodiment, the method comprises a non-maximum suppression in which, if two bounding boxes of two groups of information outputted by the neural network overlap for more than an area threshold, then the group of information with the highest score is kept.

This area threshold can be determined as a percentage of the area of each of the two bounding boxes. The percentage may be 50%. For example, the condition is verified if a bounding box overlaps on 50% of the area of the other bounding box.

This embodiment allows keeping groups of information having the best accuracy.

According to an embodiment, the distance between the object and an image acquisition module having acquired the image is determined using the diagonal length of the at least one bounding boxes.

According to a second aspect, the invention also proposes a system for processing an image, the system comprising a neural network to which the image can be inputted, the neural network being configured to obtain a plurality of feature maps, each feature map having a respective resolution and a respective depth, perform a classification on each feature map to deliver, for each feature map:
  the type of at least one object visible on the image,
  the position and shape in the image of at least one two-dimensional bounding box surrounding the at least one object,
  at least one possible viewpoint for the at least one object,
  at least one possible in-plane rotation for the at least one object.

This system can be configured to carry out all the embodiments of the method for processing an image described above.

In one particular embodiment, the steps of the method for processing an image are determined by computer program instructions.

Consequently, the invention is also directed to a computer program for executing the steps of a method as described above when this program is executed by a computer.

This program can use any programming language and take the form of source code, object code or a code intermediate between source code and object code, such as a partially compiled form, or any other desirable form.

The invention is also directed to a computer-readable information medium containing instructions of a computer program as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

How the present disclosure may be put into effect will now be described by way of example with reference to the appended drawings, in which.

DESCRIPTION OF THE EMBODIMENTS

An exemplary method and system for processing an image will be described hereinafter.

Figure 1:
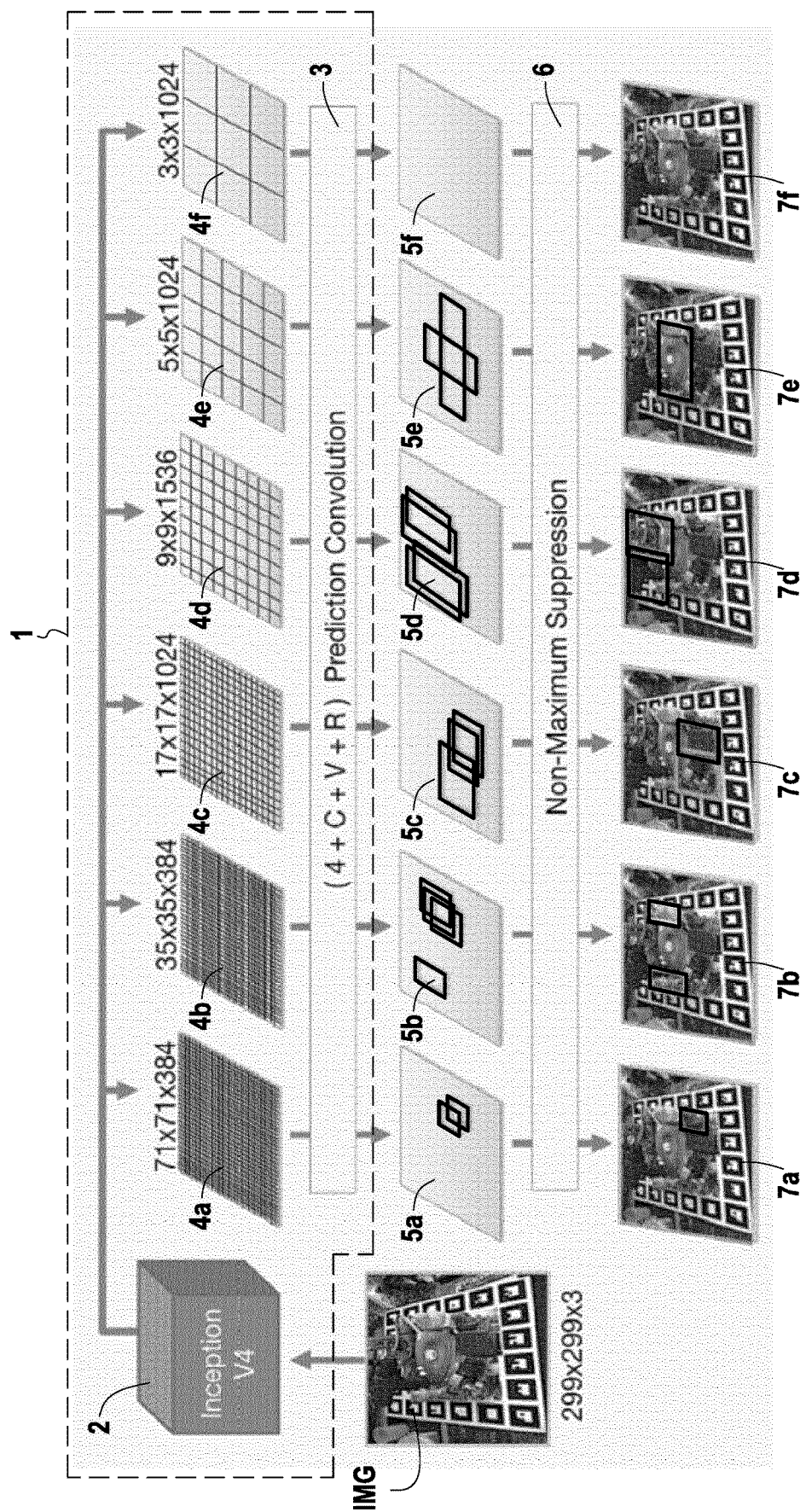
FIG. 1 is a block diagram of an exemplary method for processing an image according to an example.

A method for processing an image is represented on FIG. 1. As will be explained hereinafter, this method is also able to determine the 6D pose of objects visible on the image. The invention is however not limited to the determination of the 6D pose of an object visible on an image.

The image to be processed is referenced IMG on FIG. 1. In this example, the image has a resolution of 299 pixels of width and 299 pixels of height. The image IMG is an RGB image, each pixel of the image is therefore associated with three values.

In order to process the image IMG, this image is inputted to a neural network 1 shown on FIG. 1. If the image IMG further comprises depth information (for example if it is an RGB-D image), only the RGB values may be inputted to the neural network 1, the depth information may however be used in a subsequent refining step.

The neural network 1 is configured to obtain a plurality of feature maps, each feature map having a respective resolution and a respective depth. To this end, the neural network 1 comprises a sub-network 2 which is able to elaborate six feature maps. The six features maps each have different resolutions.

For example, a first feature map 4a has a resolution of 71 times 71 and a depth of 384. A second feature map 4b has a resolution of 35 times 35 and a depth of 384. A third feature map 4c has a resolution of 17 times 17 and a depth of 1024. A fourth feature map 4d has a resolution of 9 times 9 and a depth of 1536. A fifth feature map 4e has a resolution of 5 times 5 and a depth of 1024. A sixth feature map 4f has a resolution of 3 times 3 and a depth of 1024.

The person skilled in the art will be able to choose how many feature maps should be used as well as their resolutions and depths. For example, a calibration step can be carried out to determine the number of feature maps, their resolutions, and their depths, as a function of the application. The use of different resolutions allows detecting objects having various scales.

Preferably, the sub-network 2 is the network known by the person skilled in the art as InceptionV4 and described in "Inception-ResNet and the Impact of Residual Connections", C. Szegedy, S. Ioffe, and V. Vanhoucke.

Preferably, the sub-network 2 is trained in a prior step.

The neural network 1 is further configured to perform a classification on each feature map to deliver, for each feature map:
  the type of at least one object visible on the image,
  the position and shape in the image of at least one two-dimensional bounding box surrounding the at least one object,
  at least one possible viewpoint for the at least one object,
  at least one possible in-plane rotation for the at least one object.

To this end, the neural network 1 comprises a sub-network 2. Preferably, the sub-network 2 is a classifier, for example a kernel perceptron.

The sub-network 2 receives the six feature maps 4a to 4f as input. For example, if ws, hs, and cs respectively correspond to the width, height and channel depth at scale s (s indicates the indicia of the feature maps 4s). For each feature map 4s, a kernel perceptron having 3 times 3 as resolution and cs as depth can be used. This kernel perceptron will notably deliver scores for the type of object, the viewpoint, and the in-plane rotation.

A number Bs of possible bounding boxes may also be provided with different aspect ratios at different locations (preferably predetermined aspect ratios and predetermined locations).

The output of the kernel perceptron which has received 4s as input can then be a feature map having a resolution of ws times hs and a depth of:

$$Bs \times (C+V+R+4)$$

With C being the number of possible object classes, V being the number of possible viewpoints, and R being the number of possible in-plane rotations.

By way of example, 21222 possible bounding boxes may be used having different shapes and sizes.

Six feature maps 5a, 5b, 5c, 5d, 5e, and 5f are thus obtained as the output of the kernel perceptron. These feature maps can be interpreted as indicating:
 the type of at least one object visible on the image, for example on each feature map 4s,
 the position and shape in the image of at least one two-dimensional bounding box surrounding the at least one object on this feature map 4s,
 at least one possible viewpoint for the at least one object on this feature map 4s,
 at least one possible in-plane rotation for the at least one object on this feature map 4s.

A non-maximum suppression step 6 is then carried out.

Then, six annotated images 7a, 7b, 7c, 7d, 7e, and 7f are obtained. From these images, bounding boxes surround detected objects, and information is provided on the type of the objects, the viewpoint of the objects, and the in-plane rotation.

It is possible to deduce the 6D-pose of each of these objects from these results.

Figure 2:
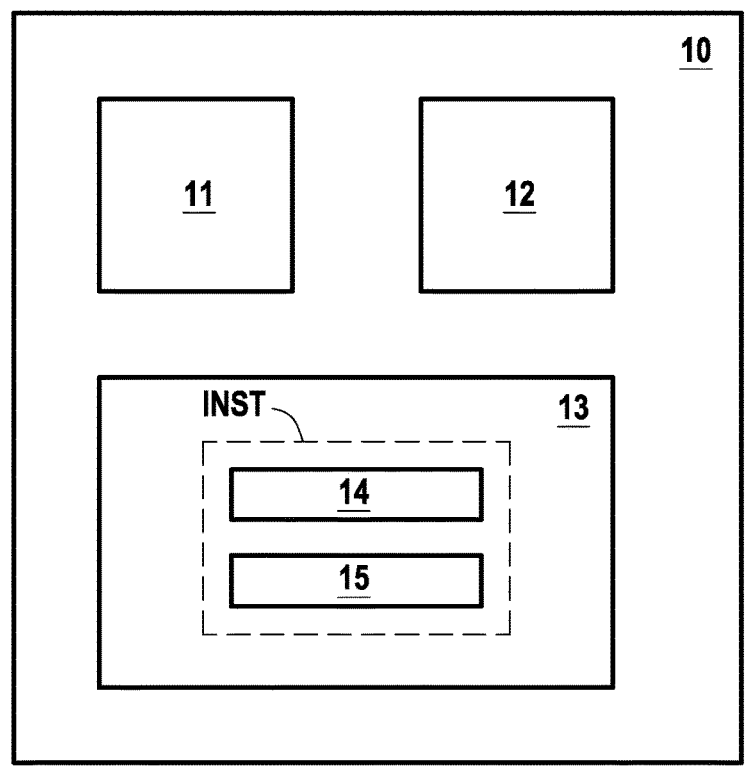
FIG. 2 is a block diagram of an exemplary system for processing an image according to an example.

The steps of the methods described in reference to FIG. 1 can be determined by computer instructions. These instructions can be executed on a processor of a system, as represented on FIG. 2.

On this figure, a system 10 has been represented. This system comprises a processor 11, an acquisition module 12 configured to acquire images, and a memory 13.

The memory 13 can be a non-volatile memory and it comprises a set of instructions (or computer program) INST which can be executed by the processor 11 to perform the method described in reference to FIG. 1. The set of instructions INST comprises:
 an instruction 14 to obtain a plurality of feature maps, each feature map having a respective resolution and a respective depth,
 an instruction 15 to perform a classification on each feature map to deliver, for each feature map:
  the type of at least one object visible on the image,
  the position and shape in the image of at least one two-dimensional bounding box surrounding the at least one object,
  at least one possible viewpoint for the at least one object,
  at least one possible in-plane rotation for the at least one object.

Figure 3:
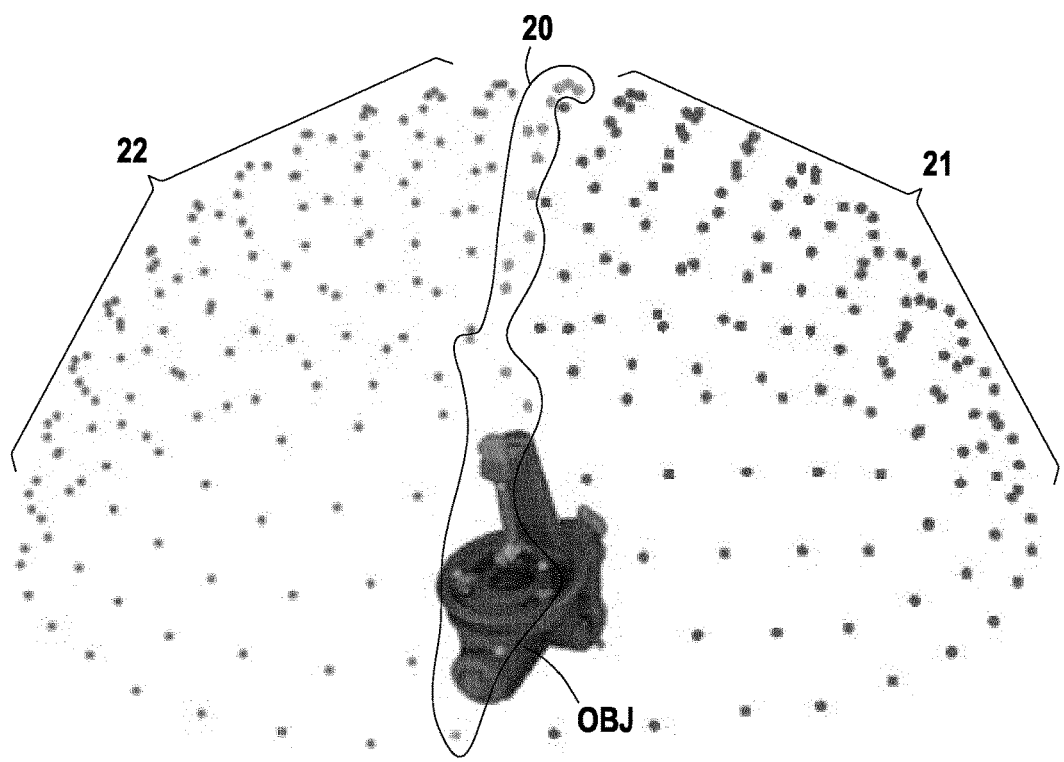
FIG. 3 shows a set of possible viewpoints for an object.

FIG. 3 shows a rendered three-dimensional template object OBJ. This object may be rendered onto images during the training of the neural network of the method of FIG. 1.

A set of possible viewpoints is also shown on FIG. 3.

More precisely, possible viewpoints 20 are placed on an arc of a sphere centered on the template object OBJ. These viewpoints are the sufficient for a symmetrical object.

Additional viewpoints 22 and 21 are each placed on an hemisphere of the sphere centered on the template object OBJ. For a semi-symmetrical object, it is possible to only use viewpoints 20 and 21 or 20 and 22. For an object with no-symmetry, all the viewpoints 20, 21, 22 may be used.

This facilitates the determination of the viewpoint of an object which is symmetrical or semi-symmetrical for which there is confusion in the determination of the viewpoints when prior art methods are used.

In fact, during the training of the neural network, only a limited set of viewpoints is used for (semi-)symmetrical objects so as to better train the neural network.

When the neural network is used to process images after the training, once the object has been detected, only the limited set of viewpoints will be classified so as to determine the viewpoint.

Figure 4:
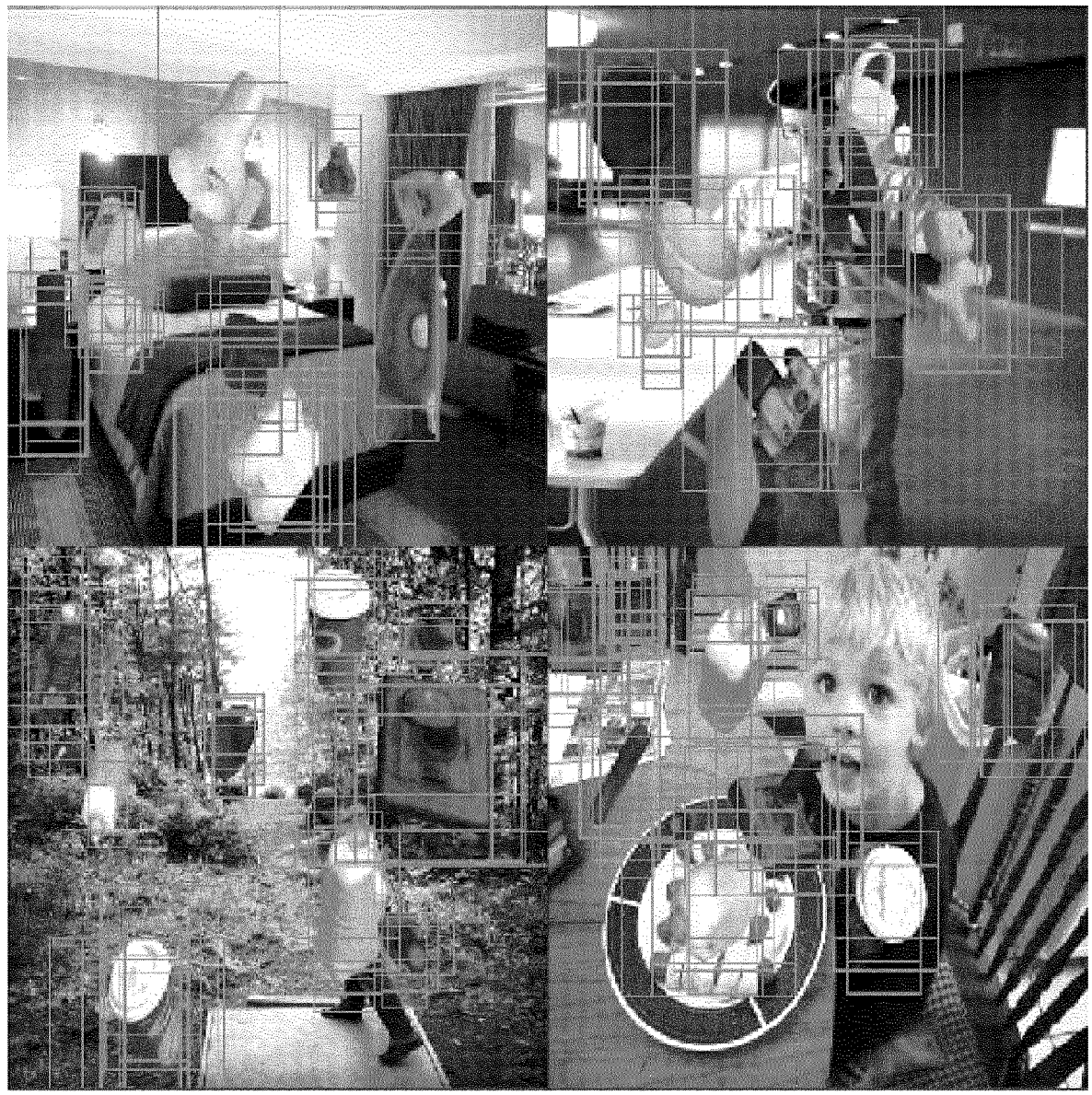
FIG. 4 shows various images used for training the neural network.

FIG. 4 shows various images used for training the neural network of the method disclosed in reference to FIG. 1, which is typically carried out before carrying out the steps of this method (and may be designated preliminary training).

Preferably, this training comprises inputting a template image in which at least one three-dimensional template object has been rendered to the neural network. For example, the template object OBJ described in reference to FIG. 3 can be rendered in images which then become the background of the template image obtained.

On FIG. 4, four template images are represented and in each template image, several template objects have been rendered.

In this example, photographs are used as a background and template objects are rendered on this background to form template images.

It has been observed by the inventors that using photographs as background yields better training results than using fully synthetic images (for example generated by a computer).

The objects which have been detected by the neural network of the present invention are surrounded by bounding boxes on the figure, for example, these are all the bounding boxes that are outputted by the neural network and which were chosen in a set of bounding boxes. More precisely, the bounding boxes represented on the figure have an area which encloses a predefined fraction of area of template object.

The bounding boxes associated with a template object which has been rendered can be sorted between bounding boxes which have an area which encloses a predefined fraction of area of template object and the remaining bounding boxes that do not verify the condition.

The above condition can be called an "intersection over union" by the person skilled in the art and the threshold to verify the condition can be set to 50% of the area of a bounding box.

Then, the training further comprises:
 obtaining, using said neural network:
 the type of at least one template object visible on the template image,
  the position and shape in the template image of at least one two-dimensional bounding box surrounding the at least one object,
  at least one possible viewpoint for the at least one template object, at least one possible in-plane rotation for the at least one template object,
and minimizing L in the following equation:

$$L(Pos, Neg) = \sum_{b \in Neg} L_{class} + \sum_{b \in Pos} (L_{class} + \alpha L_{fit} + \beta L_{view} + \gamma L_{inplane})$$

in which:
Pos represents the bounding boxes which have an area which encloses a predefined fraction of area of template object,
Neg represents the bounding boxes which have an area which does not enclose a predefined fraction of area of template object,
b is a bounding box belonging to either Pos or Neg,
$L_{class}$ is the loss associated with errors in the attribution of class,
$L_{fit}$ is the loss associated with errors the location of the corners of bounding boxes,
$L_{view}$ is the loss associated with errors in the attribution of viewpoints,
$L_{inplane}$ is the loss associated with errors in the attribution of in-plane rotations,
α, β, and γ being predetermined coefficients.

The invention claimed is:

1. A method for processing an image to be performed by a processor that processes the image through a neural network, the method comprising inputting the image by the processor to the neural network that is configured to:
   obtain a plurality of feature maps, each feature map having a respective resolution and a respective depth, wherein at least two of the plurality of feature maps have a different depth from each other, and
   perform a classification on each feature map to deliver, for each feature map:
      the type of at least one object visible on the image,
      the position and shape in the image of at least one two-dimensional bounding box surrounding the at least one object,
      at least one possible viewpoint for the at least one object, and
      at least one possible in-plane rotation for the at least one object.

2. The method according to claim 1, wherein
the image is a color image, or a color and depth image.

3. The method according to claim 1, wherein
the classification is performed by a kernel perceptron.

4. The method according to claim 1, wherein
more than two feature maps are obtained, or six feature maps are obtained, the feature maps each having a different resolution.

5. The method according to claim 1, further comprising obtaining the 6D pose of at least one object using the at least one possible viewpoint for the at least one object, and the at least one possible in-plane rotation for the at least one object.

6. The method according to claim 5, wherein
obtaining the 6D pose further comprises refining the 6D pose using a color-based approach, or a contour-based approach, or a Depth-based approach.

7. The method according to claim 1, further comprising a preliminary training of the neural network, said preliminary training comprising inputting a template image in which at least one three-dimensional template object has been rendered to the neural network.

8. The method according to claim 7, wherein said preliminary training further comprises:
   obtaining, using said neural network:
      the type of at least one template object visible on the template image,
      the position and shape in the template image of at least one two-dimensional bounding boxes surrounding the at least one object,
      at least one possible viewpoint for the at least one template object,
      at least one possible in-plane rotation for the at least one template object, and minimizing L in the following equation:

$$L(Pos, Neg) = \sum_{b \in Neg} L_{class} + \sum_{b \in Pos} (L_{class} + \alpha L_{fit} + \beta L_{view} + \gamma L_{inplane})$$

in which:
Pos represents the bounding boxes which have an area which encloses a predefined fraction of area of template object,
Neg represents the bounding boxes which have an area which does not enclose a predefined fraction of area of template object,
b is a bounding box belonging to either Pos or Neg,
$L_{class}$ is the loss associated with errors in the attribution of class,
$L_{fit}$ is the loss associated with errors the location of the corners of bounding boxes,
$L_{view}$ is the loss associated with errors in the attribution of viewpoints,
$L_{inplane}$ is the loss associated with errors in the attribution of in-plane rotations,
α, β, and γ being predetermined coefficients.

9. The method according to claim 8, wherein
the possible viewpoints are selected among a predetermined set of viewpoints, with a proviso that:
   if a template object is symmetrical, then the viewpoints of the predetermined set of viewpoints are all placed on an arc of a sphere centered on the template object, and
   if a template object is semi-symmetrical, then the viewpoints of the predetermined set of viewpoints are all placed on one hemisphere of a sphere centered on the template object.

10. The method according to claim 1, the neural network outputs one or more groups of information each associated with an object visible on the image, with each group comprising the type of the object, the position and shape of a bounding box surrounding the object, the viewpoint, and the in-plane rotation, and the method further comprises:
   elaborating a score (which is a scalar value) for each group outputted by the neural network,
   comparing each score to a predetermined threshold,
   keeping only the groups having a score above said threshold.

11. The method according to claim 10, comprising
a non-maximum suppression in which, if two bounding boxes of two groups of information outputted by the neural network overlap for more than an area threshold, then the group of information with the highest score is kept.

12. The method according to claim 1, wherein
the distance between the object and a camera having acquired the image is determined using the diagonal length of the at least one bounding boxes.

13. A system for processing an image, the system comprising a processor that processes the image through a neural network to which the image can be inputted, the neural network being configured to:
  obtain a plurality of feature maps, each feature map having a respective resolution and a respective depth, wherein at least two of the plurality of feature maps have a different depth from each other, and
  perform a classification on each feature map to deliver, for each feature map:
    the type of at least one object visible on the image,
    the position and shape in the image of at least one two-dimensional bounding box surrounding the at least one object,
    at least one possible viewpoint for the at least one object, and
    at least one possible in-plane rotation for the at least one object.

14. A non-transitory recording medium readable by a computer and having recorded thereon a computer program including instructions for executing:
  inputting, by the computer, an image to a neural network to process the image through the neural network, the neural network being configured to:
    obtain a plurality of feature maps, each feature map having a respective resolution and a respective depth, wherein at least two of the plurality of feature maps have a different depth from each other, and
    perform a classification on each feature map to deliver, for each feature map:
      the type of at least one object visible on the image,
      the position and shape in the image of at least one two-dimensional bounding box surrounding the at least one object,
      at least one possible viewpoint for the at least one object, and
      at least one possible in-plane rotation for the at least one object.

* * * * *